United States Patent
Zhang et al.

[11] Patent Number: 6,166,142
[45] Date of Patent: Dec. 26, 2000

[54] ADHESIVE COMPOSITIONS BASED ON BLENDS OF GRAFTED METALLOCENE CATALYZED AND POLAR ETHYLENE COPOLYMERS

[75] Inventors: David Dawei Zhang; I-Hwa Lee, both of Wilmington; Stephen Robert Tanny, Newark, all of Del.

[73] Assignee: E. I. du Pont de Nemours and Company, Wilmington, Del.

[21] Appl. No.: 09/234,735

[22] Filed: Jan. 21, 1999

Related U.S. Application Data

[60] Provisional application No. 60/072,734, Jan. 27, 1998.

[51] Int. Cl.[7] .............................. C08L 33/02; C08L 33/04; C08L 33/06; C08L 35/02; C08L 43/00
[52] U.S. Cl. ........................ 525/201; 525/222; 525/227; 525/240; 428/516; 428/523
[58] Field of Search ..................................... 525/191, 201, 525/221, 272, 227, 240; 428/516, 523

[56] References Cited

U.S. PATENT DOCUMENTS

| | | | |
|---|---|---|---|
| 3,868,433 | 2/1975 | Bartz et al. | 260/876 R |
| 4,230,830 | 10/1980 | Tanny et al. | 525/222 |
| 4,452,942 | 6/1984 | Shida et al. | 525/74 |
| 4,684,576 | 8/1987 | Tabor et al. | 428/441 |
| 5,198,401 | 3/1993 | Turner et al. | 502/155 |
| 5,272,236 | 12/1993 | Lai et al. | 526/348.5 |
| 5,278,272 | 1/1994 | Lai et al. | 526/348.5 |
| 5,287,272 | 2/1994 | Rutenberg et al. | |
| 5,346,963 | 9/1994 | Hughes et al. | 525/285 |
| 5,405,922 | 4/1995 | DeChellis et al. | 526/68 |
| 5,744,250 | 4/1998 | Lee et al. | 428/516 |
| 5,861,202 | 1/1999 | Kimura et al. | 428/105 |

FOREIGN PATENT DOCUMENTS

| | | |
|---|---|---|
| 0266994 | 5/1988 | European Pat. Off. |
| 0 345069 | 12/1989 | European Pat. Off. |
| 0405789 | 1/1991 | European Pat. Off. |
| 0 598626 | 5/1994 | European Pat. Off. |
| 0 605952 | 7/1994 | European Pat. Off. |
| 0 784089 | 7/1997 | European Pat. Off. |
| WO 96/30455 | 10/1996 | WIPO. |
| WO 97/27259 | 7/1997 | WIPO. |
| WO 98/49245 | 11/1998 | WIPO. |

OTHER PUBLICATIONS

International Search Report dated Apr. 26, 1999.

*Primary Examiner*—Nathan M. Nutter
*Attorney, Agent, or Firm*—Kevin S. Dobson

[57] ABSTRACT

Polyethylene-based adhesive compositions which contain as little as 5 weight percent, and up to 35 weight percent of an acid-grafted metallocene polyethylene have superior peel strength to comparable compositions containing an acid grafted non-metallocene and EVA or EMA polyethylene. Compositions where the acid-grafted metallocene polyethylene component is based on a metallocene polyethylene having a melt-flow ratio of less than 6.53 and an Mw/Mn of greater than the melt flow ratio less 4.63 are as good adhesive compositions as those based on metallocene resins falling outside these parameters.

6 Claims, No Drawings

ADHESIVE COMPOSITIONS BASED ON BLENDS OF GRAFTED METALLOCENE CATALYZED AND POLAR ETHYLENE COPOLYMERS

This application claims the benefit of U.S. Provisional Application No. 60/072,734, filed Jan. 27, 1998.

BACKGROUND OF THE INVENTION

1. Field of the Invention

This invention relates to adhesive compositions, particularly co-extrudable adhesives, suitable for composite structures, such as those having both barrier and structural layers. The adhesive compositions are blends of acid-grafted metallocene catalyzed polyethylenes and copolymers of ethylene and vinyl acetate or alkyl acrylates or other ethylenically unsaturated esters or their derivatives.

2. Discussion of Related Art

Co-extrudable adhesives based on blends of various polyethylenes which also contain an acid-grafted polyolefin to aid in adhesion to polar layers are well known.

U.S. Pat. No. 3,868,433 (Bartz et al) discloses polyolefins generally, graft-modified with acids, and which may also contain elastomers, for use as hot-melt adhesives.

U.S. Pat. No. 4,684,576 (Tabor et al) discloses adhesive blends based on acid-grafted high density polyethylene, and linear low density polyethylene of density 0.88 to 0.935.

U.S. Pat. No. 4,452,942 teaches blends of maleic anhydride grafted linear low density polyethylene and EVA, EEA or EMA.

U.S. Pat. No. 4,230,830 discloses blends of grafted HDPE or EPDM in EVA, EMA or E/IBA.

U.S. Ser. No. 08/591,330 relates to adhesive blends comprising grafted metallocene resins and conventional polyethylenes.

Known adhesives containing various polyethylenes and acid-grafted polyethylenes employ polyethylenes which are conventional-linear polyethylenes such as high-density polyethylene homopolymer (conventional-HDPE), and linear low density polyethylene copolymer (conventional-LLDPE), as well as low density polyethylene (high pressure, free-radical or LDPE).

In recent years, polyethylenes have been developed which are made using 'single-site' or 'metallocene' catalysts. These polyethylenes are dramatically more uniform in various composition related respects. They compare with conventional-HDPE and conventional-LLDPE in that they are essentially linear, containing either no or only a modest amount of long-chain branching, unlike free-radical LDPE which contains large amounts of long-chain branching. In addition, other than the catalysts employed, they can be prepared in ways similar to conventional-HDPE and conventional-LLDPE. They may contain an alpha-olefin comonomer which provides short-chain branching as in conventional-LLDPE.

The catalysts provide uniformity in various ways. The molecular weight distribution is narrow compared with that of conventional-HDPE and conventional-LLDPE. Furthermore, in alpha-olefin copolymers, the comonomer is introduced in a far more uniform way, both along any given chain and from chain to chain, so that the so-called short-chain branching distribution is narrow.

Long-chain branching in all polymers, including polyethylenes, changes their melt Theological behavior, typically making their flow more non-Newtonian over a large range of shear. Broader molecular weight distribution (MWD), without any branching, also increases non-Newtonian behavior. In LDPE, long-chain branching and broad MWD combine to provide considerable non-Newtonian behavior. Here however, long-chain branching per se, in addition to the nature of the polymerization, causes a broadening of the MWD, so that long-chain branching, broad MWD, and non-Newtonian rheology are inextricably intertwined. In certain metallocene polyethylenes, it has been found possible to have a small amount of long-chain branching which, because of its uniform positioning along the polymer chains and from chain to chain, allows the MWD to remain narrow, yet provides considerable non-Newtonian behavior. The narrow MWD provides, in general, superior properties, and the non-Newtonian behavior provides, in general, superior processability. Such long-chain branching is not necessarily present in metallocene polyethylenes however, and such metallocene polyethylenes are generally more Newtonian in their rheological behavior.

U.S. Pat. No. 5,272,236 (Lai et al.) and its continuation-in-part U.S. Pat. No. 5,278,272 (also Lai et al.) disclose metallocene polyethylene homopolymers and copolymers which have a small amount of controlled long-chain branching which causes advantageous rheology, but without broadening MWD. The amount of branching is from 0.1 to 3 long-chain branches (lcbs) per 1000 chain carbon atoms. These polyethylenes with this deliberate, small amount of long-chain branching are referred to, in a logical 'tour de force' as 'substantially linear'. (The first of these two patents, allows for 'unsubstituted' non-branched polymer as being within the definition of substantially linear, i.e., it also includes from 0 to 0.1 lcbs per 1000 chain carbon atoms). In these two patents, long-chain branching is described as being due to carbon side chains of 'at least 6 carbon atoms'. The long-chain branching is produced by certain polymerization conditions, and not by any added polymerizable species.

Short-chain branching, also uniformly positioned along the chain, can be introduced by C3–C20 alpha-olefins as well as certain acetylenically unsaturated and diolefin monomers. In practice the comonomer in metallocene polymers is typically butene or hexene, as in Exxon EXACT (TM) resins and octene in Dow AFFINITY(TM) and ENGAGE (TM) resins. Also used are propylene and norbornadiene in more elastomeric versions of metallocene polyolefin based resins. The amount of comonomer may be up to at least 30 mole percent, and these levels change the density of the polyethylenes in a comparable way to the change in density from conventional-HDPE through conventional-LLDPE, to the so-called very low density polyethylene with high comonomer content, (conventional-VLDPE) and finally to elastomers, usually with very high comonomer content.

In the above two patents, octene is typically the comonomer. Though octene will produce a side chain of 6 carbon atoms, and is introduced at a mole percent level of at least 5 percent, it is apparently not counted as a long-chain branch, despite their definition of long-chain branch. Long-chain branching appears only to refer to polymerization-produced and not comonomer-introduced branches.

These so-called 'substantially linear' metallocene polyethylenes as in the above two patents, which have been grafted with acid comonomers such as maleic anhydride are the subject of U.S. Pat. No. 5,346,963 (Hughes et al.) After grafting the advantageous MWD and non-Newtonian rheology and good melt flow of the before-grafting metallocene resins are disclosed as remaining intact, unlike grafting on conventional polyethylenes, which, according to the above patent, can cause poor rheology. The grafted resins are disclosed as being advantageous in compatibilizing various thermoplastics including olefin and non-olefin polymers, as well as in compatibilizing filler and matrix in particulate-filled resins. Blends which include blends with (non-grafted) conventional polyethylenes and LDPE, non-grafted substantially linear polyethylenes, as well as a vast range including many ethylene copolymers such as EVOH, EVA and many non-ethylene polymers, are disclosed as being extrudable into shaped articles. The grafted substantially linear polyethylenes are disclosed as being useful when made into a film 'comprising up to 100% of the graft polymer' These films exhibit desirable adhesive properties and are useful as tie layers in tying, for instance, polyethylene to EVOH. The films described and tested are prepared from 100% of the grafted substantially linear resins. Heat-seal tests described show such films seal better to polypropylene, polyamide and polycarbonate, but seal to EVOH about equally well as grafted conventional-linear polyethylene does.

There remains a continuing need for adhesives which possess superior properties to prior art conventional ethylene copolymer based adhesives or adhesive blends.

SUMMARY OF THE INVENTION

The invention depends on the discovery that even a small amount,—as little as 2 percent, and generally no more than 35 percent—of acid-grafted metallocene polyethylenes, when combined with ethylene copolymers selected from ethylene vinyl acetate ("EVA") or ethylene methacrylate ("EMA") or other ethylenically unsaturated esters or their derivatives can produce markedly superior adhesives compared with similar adhesive compositions but which contain comparable levels of acid-grafted conventional-linear polyethylene and/or acid grafted LDPE. The blends of the invention, surprisingly, have adhesive properties which do not diminish over time.

Another aspect of the invention, depends on the further discovery that the acid-grafted metallocene resins in the improved adhesive compositions do not need to be based on the so-called 'substantially linear' polyethylenes, i.e., those rheologically modified by low levels of long-chain branching, in order to manifest superior properties to those employing an acid-grafted conventional-linear polyethylene and/or acid grafted LDPE in the composition. Instead of blending the grafted metallocene resins with ungrafted substantially linear metallocene produced polyethylene, the inventors have found that EVA or EMA or similar ethylene copolymers when blended with these grafted metallocene resins produce a superior adhesive composition when compared to conventional grafted non-metallocene resins/EVA or EMA blends and also provides significant advantages over the improvements which could be solely attributable to any physical advantages associated with the grafted metallocene over the grafted non-metallocene resins copolymers. Without being bound by theory, the inventors have unexpectedly found that the particular compositions recited herein that contain both EVA or EMA and the grafted metallocenes possess unexpected adhesive properties that could be attributable to ionic interactions between the polar moieties on the EVA or EMA and the polar acid groups on the metallocene graft.

Specifically, there is provided an adhesive composition, comprising a blend of:
a) an ethylene copolymer comprising ethylene and an ethylenically unsaturated polar monomer having a polar moiety of the formula —O(CO)$C_1$–$C_6$ alkyl or —C(O)—O$C_1$–$C_6$ alkyl; and
b) from 2 to 35 wt. % based upon the weight of a)+b)+c), if present, of an acid-grafted metallocene polyethylene wherein said metallocene polyethylene is produced from a metallocene catalyst; and
c) optionally up to 30 wt. % of a polyolefin elastomer, the acid grafting agent being an unsaturated carboxylic acid or its derivative, and the level of grafting being such that the total amount of grafting agent is 0.01 to 3 weight percent based upon the total composition, a)+b)+c).

The invention more specifically provides an adhesive composition comprising a blend of or consisting essentially of a blend of
a) an ethylene copolymer having a comonomer of ethylene and a comonomer selected from an ethylenically unsaturated alkyl ester; and
b) from 5 to 35 weight percent, based on the total blend of a) plus b) plus c), of an acid-grafted metallocene polyethylene, the before-grafting metallocene polyethylene selected from the group consisting of (i) those having a melt flow ratio of less than 6.53 and an Mw/Mn ratio of greater than the melt flow minus 4.63, and (ii) those having a melt flow ratio of equal or greater than 5.63, and an Mw/Mn ratio of equal or less than the melt flow ratio minus 4.63.
c) optionally up to 30 percent of a polyolefin elastomer, the acid grafting agent being an unsaturated carboxylic acid or its derivative, and the level of grafting being such that the total amount of grafting agent is 0.01 to 3 weight percent based on the total composition, a) plus b) plus c).

A further aspect of the invention are composite structures in the form of sheets, bottles, metal composites, and particularly multilayer films, having at least two layers, wherein at least two of the at least two layers are adhered together with an adhesive composition having the above composition. The layers may be co-extruded or laminated.

DETAILED DESCRIPTION OF THE INVENTION

The ethylene copolymers of this invention are selected from EVA, EMA and other copolymers of ethylene and ethylenically unsaturated alkyl esters. EVA is available commercially from E.I. DuPont de Nemours and Company under the trademark ELVAX®. The preferred EVA has a vinyl acetate content of about nine percent although a range of 3 to 42% are also suitable. EMA is commercially available from Exxon Chemical with the preferred percentage of methyl acrylate at 6% although 3–32% MA is suitable. Other alkyl acrylate esters may also be obtained commercially or made by known processes using ethylene and a suitable ethylenically unsaturated alkyl ester ($C_2$–$C_6$ alkyl ester).

Metallocene resins which form the basis of the acid-grafted metallocene resins of this invention are selected from those polyolefins which are formed using metallocene catalysts. These can further be selected from two distinct groups. The two groups are based on two readily measurable parameters, the melt flow ratio and the Mw/Mn ratio. The first group are those metallocene resins which contain either no or very low (as distinct from a small amount of) long-chain branching, and are thus more truly linear. The second group of the before-grafting metallocene resins are those which are believed to contain a small amount of long-chain branching. This group corresponds roughly, but not precisely to those, using the same terminology as in U.S. Pat. No. 5,278,272, noted above, which are referred to as 'substantially linear'. As previously suggested, this usage may seem at odds with the essential nature of the resins, namely that they contain a small amount of long-chain branching. The term 'substantially linear' will not be used in relation to the metallocene resins of the present invention, because there appears to be a certain ambiguity in the term as discussed below. The specific distinction, for the purposes of this invention, is made, not on the amount of long-chain branching, but using specific values for two measurable parameters combined: the melt flow ratio I-10/I-2, and the molecular weight distribution, as measured by the ratio of the moments of the distribution Mw/Mn.

The 'substantially linear' metallocene resin disclosed in the above-mentioned '272 patent, is one which is stated to have from 0.01 to 3 long chain branches ("lcbs") per 1000 chain carbon atoms, long-chain branching being a branch of 'at least about 6 carbon atoms'. Metallocene resins with less than this level from 0 to 0.01 lcbs per 1000 chain atoms are included in the term 'substantially linear' in the '236 patent above, but not in the '272 patent. It is because of this ambiguity that the term will not be used in relation to the before-grafting metallocene resins of the present invention. The level of branching to which these are stated to pertain to are noted here to provide some perspective only. The distinction used between the two groups of metallocene polyethylenes which are acid grafted is, for the purposes of this invention, based solely on the melt-flow ratio and Mw/Mn ratio, because these are readily measurable parameters, and not on the level of long-chain branching, even though the parameters which distinguish the two groups of this invention are believed to correspond approximately to the two levels of long-chain branching noted. Low levels of long-chain branching such as 0.01 are more difficult to measure, and thus would represent a parameter which could not be rigorously ascertained. Furthermore, when octene, having a side chain length of 6 units, is the comonomer it is not clear to what extent this would interfere with measurement of long-chain branching. Further again, different length long chain branches will have different effects of the rheology, very long chain branches presumably having greater effect. Therefore, to distinguish resins merely by a numerical value of lcb, without reference to the branch length distribution is of limited value. By contrast, specifically measurable parameters of melt flow ratio, and Mw/Mn ratio are precise, irrespective of the underlying molecular structure to which they correspond.

Two groups of acid-grafted metallocene resins for the purposes of this invention are (i) those based on ungrafted metallocene resins which have an I-10/I-2 ratio of less than 6.53 together with an Mw/Mn of greater than (I-10/I-2)−4.63, and (ii) those based on ungrafted metallocene resins which have an I-10/I-2 ratio of equal or greater than 5.63 and an Mw/Mn ratio of equal or less than (I-10/I-2)−4.63. These ungrafted resins are the 'before-grafting' metallocene resins of the present invention. The latter ratio is also one parameter used in defining for claim purposes, the resins of U.S. Pat. No. 5,287,272. The two ungrafted metallocene resins are mutually exclusive. A resin with an I-10/I-2 of 6.23 will fall into the former category if its Mw/Mn is greater than 1.6 and the latter category if its Mw/Mn is 1.6 or less. The anhydride grafted metallocene polyethylenes are chosen from those having a density of less than or equal to 0.97 g/cc Thus the first group of ungrafted metallocene resins which form the base resin for the acid grafted resins of the present invention falls outside the resins of the '272 patent, while the second group falls within. These are the preferred resins of the invention. These preferred pre-grafted base resins have a density of at least 0.90 g/cc although suitable pre-graft density ranges are from 0.85 to 0.97 g/cc for the metallocene resins. Conventional-linear polyethylenes have I-10/I-2 values and Mw/Mn values which would generally not fall within either of these groups based on their I-10/I-2 and Mw/Mn values.

After grafting, the Mw/Mn ratio values remains low, but the ratios defining the resin before grafting are not necessarily maintained and the ratios can be expected to change somewhat. The acid-grafted metallocene resins of U.S. Pat. No. 5,346,963 (Hughes) are based on ungrafted metallocene resins as defined in the '272 patent. The acid-grafted resins which form up to 35 percent of the adhesive compositions of the present invention thus includes acid grafted resins of the Hughes patent. However, the major portion of the compositions of the present invention are not metallocene resins but are, instead, polar ethylene copolymers such as EVA. The preferred EVAs have a low vinyl acetate percentage such as 6–12% although larger percentages are also suitable.

Metallocene resins may be made using conditions well known in the prior art for continuous polymerization. That is to say, temperatures from 0 to 250° C., and pressures from atmospheric to 1000 atmospheres (100 MPa). Suspension, solution, slurry, gas phase or other process conditions may be employed if desired. A support may be employed, but preferably the catalysts are used in a homogeneous (i.e., soluble) manner. Suitable conditions and catalysts which can produce substantially linear metallocene resins are described in U.S. Pat. No. 5,278,272, which is hereby fully incorporated by reference. The reference gives full descriptions of the measurement of the well-known rheological parameters I-10 and I-2, which are flow values under different load and hence shear conditions. It also provides details of measurements of the well-known Mw/Mn ratio determination, as determined by gel-permeation chromatography (GPC). Ungrafted metallocene resins which can form the basis for the grafted resins of the present invention are also described in U.S. Pat. Nos. 5,198,401 and 5,405,922 which are also hereby fully incorporated by reference.

Surprisingly, although the superior properties of metallocene resins and acid-grafted metallocene resins depend on the narrow molecular weight distribution and, for copolymers, on the uniformity of short-chain branching both along chains and from chain to chain, it has been found that these resins can undergo major dilution with conventional ethylene copolymers having a polar monomer such as vinyl acetate or methylacrylate or other polar ethylenically unsaturated alkyl ester monomers or derivatives thereof, and optionally elastomer. The adhesive compositions of this invention need have only 2 to 35 weight percent, preferably less than 30 weight percent, and most preferably less than about 5 weight percent of acid-grafted metallocene resins. This means that 65 to 98 weight percent of the compositions have none of the supposed attractive attributes of metallocene resins, yet the overall compositions display a major improvement in adhesiveness compared with compositions containing acid-grafted non-metallocene resins. The 65 percent which is non-grafted resin is conventional ethylene vinyl acetate or ethylene methylacrylate or ethyl acrylate or other polar monomers except that up to 30 weight percent of the non-grafted portion may be a hydrocarbon elastomer.

The resins of the non-grafted portion, that is ethylene vinyl acetate or other polar ethylene copolymers and optionally elastomer will generally have a broad molecular weight distribution, and this will dominate in blends, so that the blend compositions will also have a broad molecular weight distribution. In conventional linear copolymers, the short-chain branching of the comonomer will not be uniform, and there will be species, particularly low molecular weight species with well above average levels of comonomer. In blends one might expect the 'inferior' qualities of the (non-metallocene) non-grafted major portion of the compositions to dominate. Nevertheless, in the adhesive compositions of the invention, the presence of as little as 2 weight percent acid-grafted metallocene resins will produce improvements in adhesive qualities. It has been clearly demonstrated that levels from 2 to 19 percent acid-grafted metallocene resins produce very significant improvements.

Even more surprisingly, despite the supposed advantages of acid-grafted metallocene polyethylenes of category (ii) above, (which are generally within the acid-grafted metallocene resins of the Hughes patent), it has been discovered that the acid-grafted metallocene resins of category (i) above, (those based on non-grafted resins having an Mw/Mn of greater than (I-10/I-2)–4.63 and an I-10/I-2 of less than 6.53) are generally just as advantageous or more so in the blend compositions of the present invention as the acid-grafted metallocene resins of the Hughes invention depending upon the weight percentage of the material added. Use of these low levels of (acid-grafted) metallocene resin in otherwise non-metallocene resin ethylene polar copolymer based adhesive compositions has an additional cost advantage over use of 100 percent metallocene resin, since currently these resins are relatively expensive.

All or part of the metallocene polyethylene is graft-modified with an unsaturated carboxylic acid or its derivatives. Acid grafting agents which are suitable include but are not limited to acrylic acid, methacrylic acid, fumaric acid, maleic acid, nadic acid, citraconic acid, itaconic acid, and anhydrides, metal salts, esters amides or imides of the above acids, and the like. The preferred grafting agents are maleic acid and maleic anhydride, especially the latter. The method of grafting onto the metallocene polyethylene can be any of the processes well known in the art. For example, grafting can be carried out in the melt without a solvent, as disclosed in European Patent Application No. 0,266,994, or in solution or dispersion or in a fluidized bed. Melt grafting can be done in a heated extruder, a Brabender® or a Banbury® mixer or other internal mixers or kneading machines, roll mills and the like. The grafting may be carried out in the presence or absence of a radical initiator such as a suitable organic peroxide, organic perester, or organic hydroperoxide. The grafted polymers are recovered by any method which separates or utilizes the graft polymer that is formed. Thus, the graft polymer can be recovered in the form of precipitated fluff, pellets, powders and the like.

In grafting the metallocene resin, all the molecules of metallocene may have an acid graft or grafts, or grafting may be only partial, in the sense that at least some free metallocene polyethylene molecules may remain. With grafting of this sort, there will always be some uncertainty as to whether substantially every polymer molecule will have at least one grafted acid moiety or not, particularly at low levels of grafting. If not every molecule becomes acid grafted, this is equivalent to a mix of a grafted metallocene having all molecules grafted and ungrafted metallocene resin. However, the art of grafting uniformly is well known, and the acid-grafted resin should be as uniformly grafted as possible. The limits in the adhesive composition are that the total amount of grafted metallocene resin, whether or not completely grafted, be equal or less than 35 weight percent. The use of the phrase '5–35 weight percent of an acid-grafted metallocene resin' is to be understood in this context. The amount of graft on the metallocene resin is such that the total composition of the adhesive contains from 0.005 to 5 weight percent, preferably 0.01 to 3 weight percent, more preferably 0.02 to 0.5 weight percent, and most preferably from 0.025 to 0.1. The amount of grafting in the total composition is very important. It is within the skill of the artisan to achieve satisfactory uniformity of the grafting for any given level of total grafting.

The density of the metallocene resin to be grafted can be from 0.85 to 0.97 g/cc. It can be homopolymer or copolymer. These densities correspond to a level of comonomer similar, but not identical to that which would produce the same density in conventional-linear polyethylenes. In conventional-linear resins these densities correspond to, from homopolymer HDPE to VLDPE but the metallocene resins incorporated in the compositions of this invention are not referred to in those terms since the borderline between a particular property type in conventional and metallocene resins will not be exactly the same. Metallocene elastomer olefin copolymers will also be suitable. The lower density corresponds to more than 30 weight percent comonomer, but depends on the comonomer, and these limits can include elastomers. The comonomer can be an alpha olefin containing from 3 to 20 carbons, preferably 3 to 12 and most preferably from 3 to 8. Examples include propylene, 1-butene, 1-hexene, 4-methyl-1-pentene, 1-octene, and 1-decene. Propylene, 1-hexene, 1-butene and 1-octene are preferred. The density of several suitable copolymers and the amounts of which comonomer they contain are shown in Table 1.

The melt index (MI), as measured according to ASTM D-1238, at 190° C. using a load of 2.16 kg. (the conditions of the I-2 measurement), of the grafted metallocene copolymer can be from about 0.1 to about 50, preferably about 0.3 to about 40. It should be understood that the acid-grafted metallocene polyethylene can be a mixture of more than one type of polyethylene with different MIs and/or graft levels and from more than one starting (i.e., ungrafted) metallocene resins.

The remainder of the adhesive composition is ungrafted ethylene vinyl acetate or ethylene methyl acrylate or other polar copolymers of ethylene with ethylenically unsaturated alkyl esters which may have an MI of 0.2 to 40 and a comonomer percentage of 3 to 32% or greater or mixtures of these, and optionally up to about 30 weight percent of a hydrocarbon elastomer. Many comparable adhesive compositions where the graft resin is acid-grafted conventional-linear homopolymer or copolymer polyethylene or acid-grafted LDPE are well known in the art.

The density of the final adhesive blend composition may be from about 0.88 to 0.96 g/cc., though, as indicated, the component densities of either the metallocene resin from which the grafted metallocene resin is made, or the remaining ungrafted polyethylene portion may range anywhere from 0.85 to 0.97g/cc. The grafted metallocene has a density of less than or equal to 0.97 g/cc.

A (non-grafted) hydrocarbon elastomer is optionally a component of the adhesive. Such elastomers are well known as optional components in non-metallocene resin-containing polyethylene based adhesives. The elastomers are preferably uncured, particularly when the final compositions are to be readily melt-extrudable.

For the elastomer component, thus there can be a continuum in (uncured) ethylene/alpha olefin copolymer elastomers all the way from so-called VLDPE to highly elastomeric copolymers. For the purposes of this invention, a hydrocarbon elastomer is defined as one with sufficiently low crystallinity to have a heat of fusion below about 30 joules/gram. For most elastomers the heat of fusion will be below 10 joules/gram, and many will have no measurable heat of fusion at all.

The hydrocarbon elastomer may be a copolymer of ethylene and one or more alpha-olefins selected from the group consisting of propylene, butene-1, pentene-1, hexene-1, octene-1, 4-methylpentene-1, 1,4-butadiene and 1,4-hexadiene. Examples of such elastomers would be ethylene propylene rubber, ethylene propylene diene rubber (EPDM), and ethylene propylene norbornadiene rubber. The elastomer may also be styrene-butadiene thermoplastic rubber, styrene-isoprene thermoplastic rubber, butyl rubber or polyisobutylene. The elastomer will generally be made using conventional catalysts using methods well known in the art. However, elastomers made using metallocene catalysts are not excluded.

The adhesive composition provides excellent adhesion to olefin polymers as well as to polyamides and polyamide blends with no signs of "age down" which means a change in adhesive properties over time. In some examples, age-down does occur at lower percentages of grafted-metallocene (2.5%) but does not occur or occurs less at higher loadings In particular, the adhesive composition or layer provides excellent adhesion to nylon 6, amorphous nylon or amorphous nylon/nylon 6 blends but is not limited to these substrates. The preferred use of the adhesive compositions of the invention are in multilayer structures such as meat and/or cheese packaging where oxygen barrier properties as well as formability are required. Multilayer film comprising structural layer(s), tie layers of the adhesive composition and barrier layer(s) can be made with the adhesive composition using either blown or cast film processes or others known in the art. Coextruded films comprising a support layer and the tie layer or barrier layer and the tie layer produced in this manner may further be laminated or applied onto paper, foil or olefinic or non-olefinic film or other multilayer structures.

The relative adhesive properties and adhesive strengths at comparable anhydride levels, especially when bonded to nylon or nylon blends are two to three times greater than the adhesive strength of, for example, EVA/maleic anhydride grafted EP rubber blends, EVA/maleic anhydride grafted EVA blends or EVA/maleic anhydride grafted LLDPE with little or no age down in the preferred examples. The preferred formulations in terms of adhesion to nylon blends were a maleic anhydride grafted metallocene LLDPE (2–15%) blended with an EVA (85–98%) having 3–12% VA or an EMA (90–98% with 3–12% MA) with 2.0–10% grafted metallocene LLDPE in blend. In particular, the examples show that the adhesion performance of adhesive formulations based upon EVA and acid or anhydride modified metallocene polyofefins such as mLLDPE is much better (depending upon weight percentages) than adhesive formulations based upon EVA and grafted conventional LLDPE in terms of level of adhesion and age-down effect (or lack thereof). The adhesive properties and strength are somewhat proportional to the level of grafted polymer in the adhesive resin which generally ranges from 2 to 15 weight percent grafted polymer in the adhesive blend.

Film structures tested in the examples below were generally multilayer structures comprising at least two layers such as a multilayer structure comprising a first layer selected from high density polyethylene; a second adhesive layer selected from grafted metallocene polymers/polar ethylene copolymer blends and a third layer selected from a polyamide or polyamide blend. The relative thickness of each layer depends upon the desired end use but can be, for example, 1.5 mil/0.5 mil/ and 0.8 mil respectively. Surprisingly, the inventors found that the adhesive formulations based upon maleic anhydride grafted conventional LLDPE in EVA showed substantially lower adhesion to, for example, nylon than the claimed formulations even though the total amount of maleic anhydride functionality in the conventional graft was higher than the maleic anhydride level in the metallocene graft.

EXAMPLES

The adhesive blend compositions in the following examples were prepared by dry blending the ingredients together in a polyethylene bag, and subsequently melt blending in a 30 mm. Werner Pfleiderer (TM) twin-screw extruder. Melt temperature was typically 225 to 250620 C.

The adhesive blend compositions were co-extruded between a layer of conventional-HDPE of MI 0.45 g/10 minutes, and a layer of a nylon blend (60% nylon 6 obtained from Allied Signal and 40% amorphous nylon SELAR® PA 3426 available from E.I. DuPont de Nemours and Company of Wilmington, Del.). The adhesive blends were melted at 214° C. in a 25 mm. single screw extruder operating at 56 rpm. The nylon blend was melted at 231° C. in a 25 mm single screw extruder operating at 21 rpm. All three melt streams were fed through a Brampton (TM) co-extrusion blown film die so as to form a three layer film with the HDPE at 38 microns (1.5 mil), the adhesive layer at 14 microns (0.5 mil) and the nylon blend layer at 22 microns (0.8 mil). The die temperature was 230° C. The blow-up ratio of the blown film, defined as the lay flat width of the film bubble divided by the diameter of the die opening, was 3.25. (Blow-up ratio is sometimes defined in terms of final bubble diameter rather than lay flat ratio. By this definition, the ratio would be 2.1) The film was run at 4.3 to 4.6 m/minute through the take-up rolls The multilayer structures so prepared were evaluated by measuring their peel strengths using ASTM D-1876-72, except that the test used only 3 duplicates of each sample rather than the specified 10. The test speed is 12 inches per minute (0.305 m/minute).

The adhesive compositions of this invention are most suited to be used as co-extrudable adhesives. However other adhesive forms are not excluded, including, for instance, powder-spray coating adhesives. The adhesive compositions are particularly useful for use in multi-layer packaging films, where one or more layers is a barrier to either oxygen or water, or both. Such layers include EVOH, polyamides, polyesters, polyolefins, polystyrenes, ionomers etc. The adhesives will also be useful for bonding to metals such as steel, aluminum, copper and can be used in pipe coating applications where the adhesive is used to coat a polyolefin layer onto a layer of epoxy resin.

Tables 1 and 2 shows the examples and comparative examples and data related thereto. The present invention includes ranges shown between each example in addition to the specific densities, MIs, melt flow ratios or molecular weight distributions shown e.g., for the base resin 0.895–0.917 g/cc, MI 1.6–3.4, 2.5–15 wt % grafted PE in the blend, etc.

TABLE 1

| | Grafted PE | | | | | Non-Grafted Resin | | | |
|---|---|---|---|---|---|---|---|---|---|
| | Base Resin | | | Graft | | | | Comon- | |
| EX | MI g/10 min | Density g/cc | Code | MI g/10 min | % MAN | Density g/cc | MI g/10 min | omer wt % | Code |
| EX1 | 3.4 | 0.917 | BR1 | 2.5 | 1.00 | 0.930 | 2.0 | 9 | EVA1 |
| EX2 | 3.4 | 0.917 | BR1 | 2.5 | 1.00 | 0.930 | 2.0 | 9 | EVA1 |
| EX3 | 3.4 | 0.917 | BR1 | 2.3 | 1.00 | 0.940 | 2.5 | 18 | EV2 |
| EX4 | 3.4 | 0.917 | BR1 | 2.3 | 1.00 | 0.950 | 3.0 | 28 | EVA3 |
| EX5 | 3.4 | 0.917 | BR1 | 2.3 | 1.00 | 0.942 | 6.0 | 21.5 | EMA1 |

TABLE 1-continued

|  | Grafted PE | | | | | Non-Grafted Resin | | | |
|---|---|---|---|---|---|---|---|---|---|
|  | Base Resin | | | Graft | | | | Comonomer | |
| EX | MI g/10 min | Density g/cc | Code | MI g/10 min | % MAN | Density g/cc | MI g/10 min | wt % | Code |
| EX6 | 3.4 | 0.917 | BR1 | 2.3 | 1.00 | 0.928 | 6.0 | 6.5 | EMA1 |
| EX7 | 2.2 | 0.887 | BR2 | 2.5 | 1.39 | 0.930 | 2.0 | 9 | EVA1 |
| EX8 | 2.2 | 0.887 | BR2 | 2.5 | 1.39 | 0.930 | 2.0 | 9 | EVA1 |
| EX9 | 1.6 | 0.895 | BR3 | 2.3 | 1.02 | 0.930 | 2.0 | 9 | EVA2 |
| EX10 | 1.6 | 0.895 | BR3 | 2.3 | 1.02 | 0.930 | 2.0 | 9 | EVA1 |
| C1 | 1.4 | 0.920 | BR4 | 1.3 | 1.30 | 0.930 | 2.0 | 9 | EVA1 |
| C2 | 1.4 | 0.920 | BR4 | 1.3 | 1.30 | 0.930 | 2.0 | 9 | EVA1 |
| C3 | 5.0 | 0.950 | BR5 | 2.0 | 1.00 | 0.930 | 2.0 | 9 | EVA1 |
| C4 | 5.0 | 0.950 | BR5 | 2.0 | 1.00 | 0.930 | 2.0 | 9 | EVA1 |
| C5 | 1.0 | 0.905 | BR6 | 2.5 | 1.00 | 0.930 | 2.0 | 9 | EVA1 |
| C6 | 1.0 | 0.906 | BR6 | 2.5 | 1.00 | 0.930 | 2.0 | 9 | EVA1 |
| C7 | 1.4 | 0.920 | BR4 | 1.3 | 1.30 | 0.940 | 2.5 | 18 | EVA2 |
| C8 | 1.4 | 0.920 | RB4 | 1.3 | 1.30 | 0.950 | 3.0 | 28 | EVA3 |
| C9 | 1.4 | 0.920 | RB4 | 1.3 | 1.30 | 0.942 | 6.0 | 21.5 | EMA1 |
| C10 | 1.4 | 0.920 | BR4 | 1.3 | 1.30 | 0.928 | 6.0 | 6.5 | EMA2 |

| | Adhesive Blend | | | |
|---|---|---|---|---|
| | Grafted PE | Non-Grafted Resin | Peel Strength g/inch | |
| EX | wt % | wt % | green | 1 week |
| EX1 | 2.5 | 97.5 | 1530 +/− 29 | 1345 +/− 737 |
| EX2 | 5 | 95 | 2036 +/− 237 | 2127 +/− 96 |
| EX3 | 10 | 90 | 1865 +/− 76 | 1725 +/− 100 |
| EX4 | 10 | 90 | 1302 +/− 36 | 1366 +/− 51 |
| EX5 | 5 | 95 | 1622 +/− 34 | 1706 +/− 33 |
| EX6 | 2.5 | 97.5 | 2100 | 2001 |
| EX7 | 2.5 | 97.5 | 1592 +/− 87 | 595 |
| EX8 | 5 | 95 | 1514 +/− 121 | 1297 +/− 500 |
| EX9 | 2.5 | 7.5 | 1452 +/− 24 | 301 +/59 |
| EX10 | 5 | 95 | 1524 +/− 170 | 447 |
| C1 | 2.5 | 97.5 | 1360 +/133 | 687 +/− 208 |
| C2 | 5 | 95 | 1037 +/− 127 | 698 +/− 208 |
| C3 | 2.5 | 95 | 629 +/− 157 | 130 +/− 26 |
| C4 | 5 | 95 | 759 +/− 311 | 228 +/− 104 |
| C5 | .5 | 97.5 | 1079 +/− 92 | 131 +/− 22 |
| C6 | 5 | 95 | 1582 +/− 198 | 281 +/− 85 |
| C7 | 10 | 90 | 1452 −/− 80 | 1436 +/− 109 |
| C8 | 10 | 90 | 1083 +/− 45 | 1068 +/− 49 |
| C9 | 5 | 95 | 1379 +/− 41 | 1611 +/− 56 |
| C10 | 2.50 | 97.5 | 601 +/− 590 | 256 +/− 91 |

Structure: HDPE (1.5 mil)/Adhesive Blend (0.5 mil)/Nylon blend (0.8 mil)
Code:
EVA1 is an E/VA copolymer using Ziegler-Natta catalyst, 2 MI and 9 wt % VA comonomer
EVA2 is an E/VA copolymer using Ziergler-Natta catalyst, 2.5 MI and 18 wt % VA comonomer
EVA3 is an E/VA copolymer using Ziergler-Natta catalyst, 3 MI and 28 wt % VA comonomer
EMA1 is an E/MA copolymer using Ziergler-Natta catalyst, 6 MI and 21.5 wt % MA comonomer
EMA2 is an E/MA copolymer using Ziergler-Natta catalyst, 6 MI and 6.5 wt % MA comonomer
BR1 is a metallocene-LLDPE, 8.3 wt % hexene comonomer, $I_{10}/I_2$ = 5.84, $M_w/M_n$ = 2.4, (i)
BR2 is a metallocene-VLDPE with 19.5 wt % butene comonomer, $I_{10}/I_2$ = 5.64, $M_w/M_n$ = 1.9, (i)
BR3 is a meallocene-VLDPE with 16 wt % octene comonomer, $I_{10}/I_2$ = 9.89, $M_w/M_n$ = 2.1, (ii)
BR4 is a conventional LLDPE with 7 wt % butene comonomer, $I_{10}/I_2$ = 11.29, $M_w/M_n$ = 4.22
BR5 is a conventional homopolymer HDPE, $I_{10}/I_2$ = 9.6, $M_w/M_n$ = 3.91
BR6 is a conventional VLDPE with 12 wt % butene comonomer, $I_{10}/I_2$ = 7.85 $M_w/M_n$ = 3.5

The nylon blend mentioned in the examples is composed of 60% of Nylon 6, Capron 8209F, commercially available from Allied Signal and 40% of Selar® PA 3426 commercially available from DuPont. The blend was prepared in a 2.5" HPM single screw extruder at melt temperature of 480° F.

EX1 and EX2, presented in Table 1, can be compared with C1 and C2. All the examples and comparison examples are based upon ethylene and 9% vinyl acetate E/9VA. The examples contain maleic anhydride grafted metallocene LLDPE. Whereas, the comparison examples contain maleic anhydride grafted conventional LLDPE. Despite lower total graft level vs. the comparison examples (0.025–0.05% vs. 0.03–0.065%), EX1 and EX2 give higher adhesion to the nylon blends than the two comparison examples. Especially for EX2 which shows no sign of age down in adhesion comparing to C2 which exhibits substantial amount of age down after only one week on storage under room temperature condition.

EX1 and EX2 can be compared with C3 and C4. All the blends are based on E/9VA. EX1 and EX2 containing maleic anhydride grafted metallocene LLDPE give much higher adhesion to the nylon blend comparing to C3 and C4 which contain maleic anhydride grafted conventional HDPE. Substantial amount of age down in adhesion after only one week of storage under room temperature condition was observed with C4 vs. almost no age down in EX2.

EX1 and EX2 can also be compared with C5 and C6. EX1, EX2, C5 and C6 are based on an E/9VA. Similar graft levels are found in EX1 and C5, and EX2 and C6. The adhesive blends contain maleic anhydride grafted metallocene LLDPE give much high adhesion to the nylon blend comparing the comparison blends which contain maleic anhydride grafted conventional VLDPE. Again, substantial amount of age down was observed with C5 and C6 vs. almost no age down in EX2.

EX3 and EX4 provide comparison to C7 and C8. EX3 and C7 are based on E/18VA, and EX4 and C8 are based on E/28VA. The adhesive blends containing maleic anhydride grafted metallocene LLDPE give higher adhesion to the nylon blend than the adhesive blends containing maleic anhydride grafted conventional LLDPE. However, there was no age down phenomena observed in all the examples. High level of vinyl acetate comonomer seems to help to prevent adhesion age down.

EX5 provides a comparison to C9. Both adhesive blends are based on E/22MA. The adhesive blend containing maleic anhydride grafted metallocene LLDPE gives higher adhesion to the nylon blend than the adhesive blend containing maleic anhydride grafted conventional LLDPE. Similar to what was seen with an adhesive blend based on high VA EVA and grafted LLDPE, no age down phenomena was observed.

EX6 provides a comparison to C10. Both adhesive blends are based on E/6MA. The adhesive blend containing maleic anhydride grafted metallocene LLDPE gives much higher adhesion to the nylon blend than the adhesive blend containing maleic anhydride grafted conventional LLDPE. Similar to what we have seen with adhesive blend based on low VA EVA and grafted LLDPE, substantial amount of age down was observed with adhesive blend containing grafted conventional LLDPE and low MA EMA.

EX7,EX8, EX9 and EX10 are composed of E/9VA and metallocene VLDPE with butene or octene comonomer. Peel strength tests show the adhesive blends provide excellent green adhesion to the nylon blend. However, the peel strength drops over time especially for blends (EX7 and EX9) containing only 2.5% of graft polymer. For blends containing 5% graft polymer(EX8 and EX10), the drop in adhesion to the nylon blend is not as severe as in C6, an adhesive blend which contains E/9VA and 5% grafted conventional VLDPE The data in Tables 1 and 2 demonstrate that, for compositions varying in various ways such as (i) density of the grafted resin, (ii) net graft level of the composition, (iii) net density of the composition, (iv) MI of the graft resin or of the base resin before grafting, (v) MI of the non-graft component or components, (vi) comonomer percentage in EVA or EMA and (vii) relative percentages of grafted components, versus comparable non-metallocene components in said blends, use of a grafted metallocene grafted polyethylene at very modest levels provides adhesive compositions with superior peel strength or other advantageous properties (age-down and lack thereof).

The preferred acid-grafted resins in these compositions are grafted metallocene resin, where the before-grafting metallocene resins from which they derive are ethylene/butene copolymers, all of which fall outside the substantially linear category of U.S. Pat. No. 5,278,272 (e.g., are in group (i) and not in group (ii). The preferred acid-grafted resin thus also falls outside the limits of the acid-grafted resins of U.S. Pat. No. 5,346,963. Nevertheless, they provide a superior level of adhesion to use of grafted, conventional-linear resins. Furthermore, the preferred level of the acid-grafted metallocene resin is only from 2.0 to 10 weight percent in the total composition. This means that at least 65% and preferably more than 90% percent of the compositions have all the 'undesirable' qualities attributed to conventional resins with regard to molecular weight distribution and comonomer distribution. It appears that just 2–10 percent of grafted metallocene resin, for these particular compositions, is sufficient to provide superior peel strengths, despite the large portion of conventional resins.

The adhesive blend compositions in Examples 11–12 and Comparative Example C11 were prepared by dryblending ingredients in a 50 pound mixer, and subsequently melt blending on a 2.5 inch HPM single screw with a melt temperature typically between 200 to 220 degrees C.

The adhesive blend compositions were coextruded in a 5 layer cast film with two outer layers of conventional-LDPE of density 0.918 g/cc and MI of 7 g/10 min, and a core layer of Capron B73WP, a nylon 6 grade from Allied Signal. The adhesive blends were melted at 238 C in a 2.5 inch single screw extruder. The conventional LDPE was melted at 288 C in a 4.5 inch single screw extruder and the nylon was melted at 271 C in a 2.5 inch extruder. The three melt streams were fed through an Egan die set at 255 C and cast onto a Mylar® polyester film substrate. The air gap was set at 15 cm (6 inches) and the chill roll maintained at 10 C. The film was cast at two different line speeds: 122 meters/min (400 feet/min) and 213 meters/min (700 feet/min). The film had a volume distribution of 60% and 20% for the LDPE layers, 5% for each of the two tie layers and 10% for the central nylon layer to make a total film gauge of 76.2 microns (3 mils).

The films were sealed together on the thinner LDPE side at 132 C (270F) for 0.5 seconds at 27.6 Mega-Pascals (40 pounds per square inch). The sealed films were then evaluated by measuring their peel strengths using ASTM D-1876-72, except that the test used 3 duplicates instead of 10. The test width was 1.27 cm wide and the test speed was 6 inches per minute (0.153 m/minute).

TABLE 2

| | Grafted PE | | | | | Non-Grafted Resin | | | |
|---|---|---|---|---|---|---|---|---|---|
| | Base Resin | | | Graft | | | | Comon- | |
| EX | MI g/10 min | Density g/cc | Code | MI g/10 min | % MAN | Density g/cc | MI g/10 min | omer wt % | Code |
| EX11 | 3.4 | 0.917 | BR1 | 2.5 | 1.00 | 0.930 | 2.0 | 9 | EVA1 |
| EX12 | 3.4 | 0.917 | BR1 | 2.5 | 1.00 | 0.930 | 2.0 | 9 | EVA1 |
| C11 | 5.0 | 0.950 | BR5 | 2.0 | 1.00 | 0.930 | 2.0 | 9 | EVA1 |

Adhesive Blend

| EX | Grafted PE Wt % | Non-grafted Resin Wt % | Film Line Speed Meters/min | 1 Week Peel Strength Gm/25 mm |
|---|---|---|---|---|
| EX11 | 5 | 95 | 122 | 1510 ± 826 |
| | | | 213 | 336 ± 80 |
| EX12 | 15 | 85 | 122 | 2032 ± 64 |
| | | | 213 | 2050 ± 204 |
| C11 | 15 | 85 | 122 | 387 ± 50 |
| | | | 213 | 288 ± 178 |

EX11 and EX12, presented in Table 2, can be compared with C11. All the examples and comparison examples are based upon ethylene and 9% vinyl acetate E/9VA. The examples contain maleic anhydride grafted metallocene LLDPE. Whereas, the comparison example contains maleic anhydride grafted conventional UDPE. The examples here use a cast film process running at high line speeds, instead of the blown film process exemplified by Table 1. Here too, the examples which contain the maleic anhydride grafted metallocene LLDPE give much higher adhesion to nylon than the comparative example containing grafted conventional HDPE, in spite of, in the one case, the higher anhydride level in the comparative example C11 compared to one of the examples, EX11. In the other case, the anhydride levels in the adhesive blend are the same, yet EX12 has significantly better performance than C11.

What is claimed is:

1. An adhesive composition, comprising:
   a) an ethylene copolymer comprising ethylene and an ethylenically unsaturated polar monomer having a polar moiety of the formula O—(CO)$C_1$–$C_6$ alkyl of —(CO)—O$C_1$–$C_6$ alkyl;
   b) from 2 to 35 weight percent, based on the total weight of a) plus b) plus c), of c) is present, of a metallocene polyethlene graft-modified with an acid grafting agent, the acid grafting agent being an unsaturated carboxylic acid or its derivative, and the level of grafting being such that the total amount of grafting agent in the total composition a) plus b) plus c) is from 0.01 to 3 weight percent; and
   c) optionally up to 30 weight percent of a hydrocarbon elastomer.

2. The composition of claim 1, wherein component a) is selected from an ethylene vinyl acetate copolymer or is selected from an ethylene alkyl acrylate or methacrylate ester and component b) is an acid grafted metallocene polyethlene, the metallocene polyethylene selected from the group consisting of (i) those having a melt flow ratio of less than 6.53 and an Mw/Mn ratio of greater than the melt flow ratio lest 4.63, and (ii) those having a melt flow ratio of equal or greater than 5.63 and an Mw/Mn ratio of equal or less than the melt flow ratio less 4.63, with the proviso that Mw/Mn cannot be less than 1, and wherein component b) is present in an amount of from 2 to 35 weight percent, based on the total weight of a) plus b) plus c).

3. The composition of claim 1, wherein component b) is selected from a grafted metallocene linear low density polyethylene copolymer of ethylene and a C3–C8 alpha-olefin comonomer.

4. The composition of claim 1 wherein b) is less than 30 weight percent of the total composition, and the amount of grafting agent is from 0.05 to 0.25 weight percent of the total composition a) plus b) plus c).

5. The composition of claim 2 wherein the metallocene polyethylene has a melt flow ratio of less than 6.53 and an Mw/Mn ratio of greater than the melt flow ratio less 4.63.

6. The composition of claim 3 wherein b) is less than 20 weight percent of the total composition, and the amount of grafting is from 0.02 to 0.5 weight percent of the total composition a) plus b) plus c).

* * * * *